United States Patent [19]

Vogel

[11] 4,110,209
[45] Aug. 29, 1978

[54] METHOD FOR TREATING A MEDIUM CONTAINING WATER WITH COAGULANTS

[75] Inventor: Walter Vogel, Max-Plank-strasse 7a, D-6700 Waldsee, Germany

[73] Assignees: Egon Cherdron, Limburgerhof; Otto Helmboldt, Ludwigshafen am Rhein; Walter Vogel, Waldsee, all of Germany

[21] Appl. No.: 691,717

[22] Filed: Jun. 1, 1976

[30] Foreign Application Priority Data

May 31, 1975 [DE] Fed. Rep. of Germany ....... 2524172

[51] Int. Cl.² ................................................ C02B 1/20
[52] U.S. Cl. ......................................... 210/44; 210/49
[58] Field of Search .................... 210/42 R, 44, 49, 59

[56] References Cited

U.S. PATENT DOCUMENTS

| 2,413,375 | 12/1946 | Pomeroy | 210/49 X |
| 3,377,274 | 4/1968 | Burke et al. | 210/49 X |
| 3,925,203 | 12/1975 | Turner | 210/44 |
| 3,932,275 | 1/1976 | Mewes et al. | 210/49 |
| 3,977,970 | 8/1976 | Willis et al. | 210/44 |

FOREIGN PATENT DOCUMENTS 1,924,527 11/1970 Fed. Rep. of Germany ............. 210/49

Primary Examiner—Morris O. Wolk
Assistant Examiner—Arnold Turk
Attorney, Agent, or Firm—Spencer & Kaye

[57] ABSTRACT

Method for increasing the chemical efficiency of precipitating agents having a metal base in the treatment of water, waste water or sludge. The medium to be treated is initially conducted by pressure into a mixing cell where it is mixed in free turbulence with a precipitant solution and caused to react to form a reaction mixture containing flocs. The reaction mixture is conducted into a separating basin in which the flocs are removed from the clear water.

5 Claims, 2 Drawing Figures

METHOD FOR TREATING A MEDIUM CONTAINING WATER WITH COAGULANTS

BACKGROUND OF THE INVENTION

The present invention relates to a method for increasing the chemical efficiency of precipitating agents in the treatment of water, waste water and sludge. The method of the present invention is particularly useful in the purification of waste waters.

Methods for coagulating turbid waters or waste waters containing dissolved and undissolved organic and inorganic contaminants are known. The coagulating or precipitating agents, respectively, employed may be inorganic as well as organic compounds. Combinations of inorganic and organic compounds have also been proposed.

It is also known that the coagulating and precipitating chemicals employed for water purification can likewise be used with success for the dewatering of sludges.

Waste waters containing phosphates and/or other dissolved and undissolved contaminants are treated according to the present state of the art in a so-called chemical purification stage with coagulating chemicals having a metal base, for example, iron and/or aluminum salts. Although the precipitation of the contaminants with coagulating chemicals having a metal base is considered by persons skilled in the art to be very effective, the efficiency of the known processes for chemical water purification still is unsatisfactory. Thus, for example, in order to obtain sufficient phosphate precipitation it is necessary to employ a high excess of precipitating chemicals. The stoichiometric quantities required for precipitation are not sufficient for this purpose. It has been known for a long time that the degree of efficiency of chemical water purification is influenced not only by the consistency of the water and the type and quantity of the coagulant employed, but to a great extent also by the mixing conditions (degree of turbulence). Appropriate research and proposals for improvement based on such research, however, have not been made to any noticeable extent in these areas.

It is also known that an increase in the chemical efficiency, e.g., by increasing the mixing-in turbulence, is combined with poorer floc growth conditions. Further, this simultaneously worsens the separation effect so that the total purification effect, including floc formation and floc separation, is not increased.

SUMMARY OF THE INVENTION

It is a primary object of the present invention to provide a process for the chemical treatment of water, waste water and sludge in which the chemical efficiency of metal salt coagulants is significantly improved.

It is a further object of the present invention to keep the separation effect during the subsequent separation of the floc high enough by selection of and/or combination with suitable processes so that complete floc separation is assured.

Another object of the present invention is to provide an increase in efficiency as a result of high mixing-in turbulence under particularly favorable conditions, e.g., during coagulation of activated sludge containing waste waters and with a low hydraulic load of the post-clarification tank, and produce a satisfactory sedimentation.

Additional objects and advantages of the present invention will be set forth in part in the description which follows and in part will be obvious from the description or can be learned by practice of the invention. The objects and advantages are achieved by means of the processes, instrumentalities and combinations particularly pointed out in the appended claims.

To achieve the foregoing objects and in accordance with its purpose, the present invention, as embodied and broadly described, provides a method for increasing the chemical efficiency of a precipitating agent having a metal base in the treatment of water, waste water and sludge, comprising initially conducting by pressure the medium to be treated into a mixing cell and mixing it in the mixing cell in free turbulence with a precipitant solution to form a reaction mixture containing floc, and then conducting the reaction mixture into a separating basin in which the floc is separated from the clear water.

It is to be understood that both the foregoing general description and the following detailed description are exemplary, but are not restrictive of the invention.

BRIEF DESCRIPTION OF THE DRAWINGS

The accompanying drawings, in which like numbers indicate like parts, illustrate examples of presently preferred embodiments of the invention and, together with the description, serve to explain the principles of the invention.

DETAILED DESCRIPTION OF THE PREFERRED EMBODIMENTS

Figure 1:
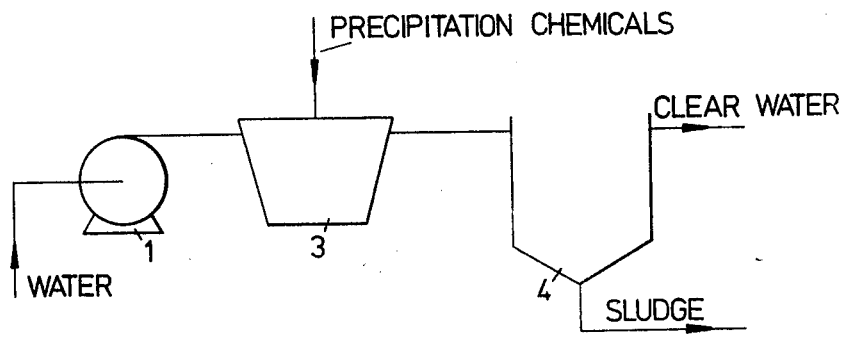
FIG. 1 is a schematic diagram showing an apparatus for practicing the method of the present invention.

In the practice of the present invention, the medium to be treated can be water, waste water or sludge. The water or waste water treated by the method of the present invention can, for example, be industrial waste water containing chemicals or waste water from domestic sewage and can contain phosphates and/or other dissolved and undissolved organic and inorganic contaminants. In the present invention, the water or sludge is mixed with a precipitating solution on the basis of free turbulence and this mixing can be effected in any mixing cell suitable for this purpose, particularly in a mixing cell as described in German Utility Model No. 7,148,281 (Gebrauchsmuster), hereby incorporated by reference. In such a device, a flowing liquid is known to be greatly accelerated in a logarithmic spiral and with a loss of pressure when it enters the mixing cell and is thus provided with a twist. Through a diffusor-type widened portion, a suction pressure is created in the center of the spiral which produces a return flow of the liquid in the region near the axis. This return stream is deflected on the base plate of the entrance spiral, and flows to the outlet together with the fresh medium.

The precipitant solution is dosed into the mixing cell from the top into the central return stream, is carried along by the return stream and transported to the interior of the mixing cell. A zone of intensive turbulence then forms between the forward stream near the walls of the mixing cell and the central return stream so that a homogeneous mixture is produced very rapidly.

The precipitant solution reacts with the water in the mixing cell to form a reaction mixture containing flocs. The reaction mixture is then conducted into a separating basin and the flocs are separated from the resulting clear water.

It has been found that the efficiency of the recipitants as compared with the state of the art is at least doubled by the intensive mixing of the present invention. In this way, the same purification effect is realized with substantially reduced quantities of chemicals for the coagulation process. Further, the salt charge of the waters is lowered correspondingly.

According to a particularly favorable embodiment of the present invention, the precipitation in free turbulence is effected with a water or sludge which has been supersaturated with gas under pressure so that during the mixing in free turbulence there is an expansion of the gas and charging of the flocs with gas bubbles which enables the separation of the floc in the separating basin to be effected by flotation. As already mentioned, an increase in the mixing intensity reduces the growth capability of the floc to such an extent that the flocs remain small, and in the past small flocs could be separated only with difficulty by sedimentation and/or filtration. This difficulty, which occurs during intensive mixing, is overcome in an unexpected and advantageous manner by supersaturation with gas.

For the purpose of supersaturating the water or sludge with gas, it is preferred to use air as the gas. The degree of supersaturation in water and thus the amount of pressure and the period during which air is introduced, are selected so that the flocs formed in the mixing cell are charged with so much gas during expansion so as to assure subsequent separation of the floc from the clear water by flotation. The amount of pressure in the pressure vessel 2 (FIG. 2) lies between 2 and 6 kg/cm$^2$ gauge and the period during which the gas is introduced between 1 and 6 minutes. The gas dissolution takes place in the pressure vessel.

The technical advance of the new process, particularly in the above-described embodiment of the process where the water is supersaturated with gas, is seen in that the intensive mixing process which is based on free turbulence increases the chemical efficiency of the coagulants employed. Further, the consumption of coagulant, the salting of the waste water and the energy requirements for the treatment process can be lowered substantially by the combination of intensive mixing and the expansion and flotation steps of the preferred embodiment of the present invention. Moreover, the period of dwell in the mixing cell can be greatly reduced by the practice of the present invention. It has been found that reaction periods of substantially less than 1 second are already sufficient to produce a homogeneous mixture, a reaction between precipitant solution and waste water contents and a development of primary floc. Generally, the dwell time in the mixing cell is between 0.1 and 1.5 seconds.

The flocs produced during intensive mixing are small and are charged in the mixing cell in nascent state with the gas bubbles released during the expansion. In the charged state, they can then be easily separated from the clear water by flotation. A floc growing period and an additional metering out of coagulant, as it is necessary for the separation of floc by sedimentation and/or filtration, are thus eliminated in the process according to the present invention.

The highest chemical efficiency results with the optimum quantity of precipitating agent required for accumulation and precipitation of the contents of the water. This must be determined in comparative experiments for each precipitating agent and in dependence on the respective mixing conditions.

The precipitant solution of particular advantage in the process of the present invention is one which, when diluted with the water in the mixing cell, will react very rapidly. Such precipitant solutions, can contain as the active precipitating agent, for example, aluminum sulfate, iron (III) sulfate, aluminum chloride, and iron (III) chloride, as well as mixtures of these compounds. Calcium compounds and iron (II) compounds can also be used, but exhibit poorer efficiency for chemical purification under intensive mixing conditions.

The concentration of the precipitant solution can be between 3 and 40 weight percent, but is preferably about 4 to 6 weight percent. If less concentrated solutions are used, the pH of these solutions must be lowered so that no hydrolysis will take place in the reservoir where the precipitant solution is stored. The critical pH values lie, for example, for iron (III) salts between 2 and 3 and for aluminum salts between 3 and 4, a certain precipitant concentration being associated with each of these ranges. For basic salts (e.g., aluminum oxychloride) the critical pH for hydrolysis in the reservoir is reached at a higher concentration.

If necessary, the mixing cell with free turbulence can also be combined with other stages of chemical water treatment, for example adsorption with activated carbon or oxidation. It is combined with particular advantage with a flotation system where the required energy simultaneously serves to dissolve the gas and to produce the flow in the mixing device.

Turning now to FIG. 1, there is shown a pump 1 which presses the waste water to be treated directly into a mixing cell 3. The precipitating solution is introduced into the top of mixing cell 3 and reacts with the waste water to form a reaction mixture containing flocs. The reaction mixture is conducted to a separating basin 4 where sedimentation occurs with sludge settling to the bottom and clear water forming at the top. After sedimentation, the sludge is removed at the bottom and the clear water is removed at the top of separating basin 4.

Figure 2:
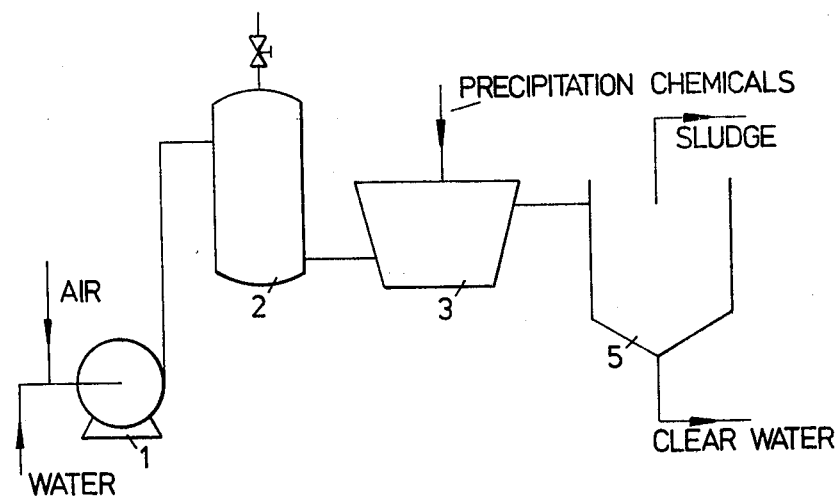
FIG. 2 is a schematic diagram showing another apparatus for practicing a preferred embodiment of the method of the present invention.

FIG. 2 illustrates the particularly advantageous embodiment of the invention where the water is supersaturated with gas. In FIG. 2, pump 1 presses the water together with air into a pressure vessel 2 from which the water which has been supersaturated with air is transported into mixing cell 3. The water is intensively mixed in free turbulence in mixing cell 3 with a precipitating solution introduced into the top of mixing cell 3. A reaction mixture containing flocs is produced in mixing cell 3 and introduced into separating basin 5 where the flocs rise to the top of the separating basin as a result of the water having been supersaturated with air. The flocs are removed by flotation from the top of separating basin 5 and clear water is removed from the bottom of separating basin 5.

The following examples are given by way of illustration to further explain the principles of the invention. These examples are merely illustrative and are not to be understood as limiting the scope and underlying principles of the invention in any way. All percentages referred to herein are by weight unless otherwise indicated.

EXAMPLE 1

This example illustrates the chemical purification of biologically partially purified waste water as obtained, for example, from a trickling filter.

The average analysis values after sedimentation of the waste water which comes from the trickling filter and is not treated chemical, were as follows:

| | |
|---|---|
| $BOD_5$ | 110 mg/l |
| Ortho-P (phosphorus) | 12 mg/l |
| Suspended matter | 10 mg/l |
| Hydraulic Load of the Post-Clarification Basin | 0.66 m/h |

In this example, 200 g of precipitating agent/m³ of waste water are supplied. This amount of precipitating agent is equal to 1.7 times the stoichiometric amount with respect to Ortho-P. The precipitating agent used was a mixture of iron (III) sulfate and aluminum sulfate. The precipitating agent was added to the waste water in a solution having a concentration of 10% weight percent of precipitating agent.

Two separate tests were run using the above conditions. In the first test, coagulation was effected under conventional mixing conditions followed by separation of the floc by sedimentation.

The clear water analysis values for the resulting treated water were as follows:

| | | |
|---|---|---|
| $BOD_5$ | 80 mg/l | |
| Ortho-P (phosphorus) | 2 mg/l | = 80% elimination |
| Suspended matter | 5 mg/l | |

In the second test, coagulation was effected according to the present invention where there was an intensive mixing with free turbulence followed by separation of the flock by sedimentation.

The pressure loss in the mixing cell was 2 m column of water.

The clear water analysis values for the treated water obtained according to the process of the present invention were as follows:

| | | |
|---|---|---|
| $BOD_5$ | 55 mg/l | |
| Ortho-P (phosphorus) | 0.4 mg/l | = 97% elimination |
| Suspended matter | 2 mg/l | |

The sedimentation speed of the resulting floc is reduced from about 1.5 m/h for conventional coagulation to 1.0 m/h for the intensive coagulation of the present invention. Both of these values are sufficient for the hydraulic load indicated. Under the conventional coagulation conditions, the flocs had different sizes (small to large) while under the intensive mixing conditions according to the present invention, the flocs all have the same size. This results in the lower contents of suspended matter in the clear water obtained by following the process of the present invention.

EXAMPLE 2

This example illustrates the chemical purification of partially biologically purified waste water by coagulation and flotation in accordance with the present invention.

The waste water to be treated had average discharge analysis values without floc formation after sedimentation as follows:

| | |
|---|---|
| Total P (phosphorus) | 32.6 mg/l |
| Ortho-P (phosphorus) | 24.7 mg/l |
| $KMnO_4$ consumption | 180 mg/l |
| $BOD_5$ | 170 mg/l |

In this example, 400 g of precipitating agent/m³ of waste water are supplied. The precipitating agent was a mixture of iron (III) sulfate and aluminum sulfate and was supplied as a precipitating solution having a concentration of 10 weight percent. The pump prepressure for the intensive mixing and to dissolve air in the water was 4 atmospheres gauge.

After separation of the flocs by flotation in the separating basin, clear water analysis values of the resulting treated water obtained by following the process of the present invention were as follows:

| | |
|---|---|
| Total P (phosphorus) | 1.7 mg/l |
| Ortho-P (phosphorus) | 0.7 mg/l |
| $KMnO_4$ consumption | 100 mg/l |
| $BOD_5$ | 50 mg/l |

The flotation speed of the formed floc was equal to the hydraulic load limit of the separating basin and was greater than 6 m/h.

A comparison test was performed using the same precipitating solution and amount of precipitating agent in a conventional coagulation procedure and where the floc was removed by sedimentation. The corresponding analysis values for this conventional floc formation were as follows:

| | |
|---|---|
| Total P (phosphorus) | 7.7 mg/l |
| Ortho-P (phosphorus) | 3.8 mg/l |
| $KMnO_4$ consumption | 130 mg/l |
| $BOD_5$ | 90 mg/l |

The sedimentation speed of the resulting floc using this conventional procedure was 1.1–1.2 m/h.

Clear water analysis values similar to those obtained by the intensive mixing of the present invention could be obtained under conventional coagulation conditions by using 800 g precipitating agent/m³ waste water. With such large quantities of precipitating agent, however, the waste water pH had to be corrected.

EXAMPLE 3

This example illustrates the treatment of a water containing an oil emulsion wherein the emulsion is split by the treatment.

The medium to be treated is a spent drilling oil emulsion containing various emulgents and having an oil content of 4.8 weight percent.

In this example, 2.5 g of precipitating agent per liter of emulsion were used to split the emulsion. The emulsion was split using conventional mixing procedures and was split in accordance with the process of the present invention where the emulsion was supersaturated with a gas and intensively mixed in free turbulence. In the conventional procedure, during subsequent neutralization, a floating layer and a sediment are produced and many flocs remained suspended. In the conventional operation, it was therefore necessary to remove the floating layer, have a secondary floc formation of the remaining suspended material, and subject the medium to sedimentation.

When floc formation was effected according to the present invention, the oil-containing floc clearly and quickly floated with a flotation speed of about 7 m/h. The clear water was substantially free of suspended matter and contained less than 2 mg/l of such suspended matter. The resulting sludge was lifted out of the water by the air bubbles and the oil. The resulting volume of sludge was about 30% compared to the conventional mode of operation.

EXAMPLE 4

This example illustrates the conditioning of clarification sludge for dewatering in drying beds.

The solid content of the sludge before dewatering was 8%. In the conventional mode of operation, 12 kg metal salt/m$^3$ wet sludge and 8 kg lime/m$^3$ wet sludge, would be required to be used as the precipitating agent. With such a mode of operation, lime deposits formed and produced compaction in the sand bed so that these beds had to be loosened up at least once a year.

When conditioning was effected by intensive mixing and flotation in accordance with the present invention, 10 kg metal salt/m$^3$ wet sludge were all the chemicals required. By using the method of the present invention, there was no need for the addition of lime. Due to the flotation, pumping into the drying bed resulted in a separation into solids (about 40%) and water (about 60%). The dewatering speed was so high that the drainage pipes of the drying bed were overloaded during the filling process.

The constant level of sludge was developed with intensive mixing according to the present invention after 8 hours, whereas with filling according to conventional conditions it occurred after 11 days. The amount of precipitating agent depends on dissolved and undissolved contaminants to be removed.

It will be understood that the above description of the present invention is susceptible to various modifications, changes and adaptations, and the same are intended to be comprehended within the meaning and range of equivalents of the appended claims.

What is claimed is:

1. A method for increasing the chemical efficiency of a precipitating agent having a metal base in the treatment of a medium containing water, comprising: initially conducting, by pressure the medium to be treated into a mixing cell and mixing it in the mixing cell in free turbulence with a precipitant solution containing the precipitating agent to form a reaction mixture containing flocs, conducting the reaction mixture into a separating basin and removing the flocs from clear water in the separating basin.

2. The method as defined in claim 1 wherein the precipitant solution contains as a precipitating agent at least one water soluble, aluminum salt or iron (III) salt.

3. The method as defined in claim 1 wherein the medium to be treated is supersaturated with gas under pressure before it is introduced into the mixing cell.

4. The method as defined in claim 3 wherein the gas under pressure is air.

5. The method as defined in claim 3 wherein the supersaturation of the medium with gas under pressure is effected in a pressure vessel.

* * * * *